United States Patent

[11] 3,604,368

| [72] | Inventor | Jack E. Baxter |
| | | Cincinnati, Ohio |
| [21] | Appl. No. | 815,755 |
| [22] | Filed | Apr. 14, 1969 |
| [45] | Patented | Sept. 14, 1971 |
| [73] | Assignee | The Baxter Company |

[54] PALLET AND METHOD OF MANUFACTURE
3 Claims, 5 Drawing Figs.

[52] U.S. Cl. .................................................. 108/57
[51] Int. Cl. ............................................. B65d 19/18
[50] Field of Search ........................................ 108/51–58; 264/45

[56] References Cited
UNITED STATES PATENTS

| 3,228,358 | 1/1966 | Sepe et al. ..................... | 108/58 |
| 3,307,504 | 3/1967 | Cloyd et al. ................... | 108/58 |
| 3,330,228 | 7/1967 | Donnelly ...................... | 108/51 |
| 3,404,642 | 10/1968 | Beecher et al. .............. | 108/51 |
| 3,467,032 | 9/1969 | Rowlands et al. ............ | 108/51 |
| 3,511,191 | 5/1970 | Berry, Jr. et al. ............. | 108/58 |
| 3,187,689 | 6/1965 | Hess ............................. | 108/58 |
| 3,405,666 | 10/1968 | Miller ........................... | 108/58 |
| 3,481,285 | 12/1969 | Yellin ............................ | 108/58 |
| 3,124,627 | 3/1964 | Hood ............................. | 264/45 |
| 3,135,640 | 6/1964 | Kepka et al. ................. | 264/45 |
| 3,187,069 | 6/1965 | Finch et al. .................. | 264/45 |

Primary Examiner—Bobby R. Gay
Assistant Examiner—Glenn O. Finch
Attorney—Harness, Dickey and Pierce ABSTRACT: A four-way entry pallet is vacuum formed from two spaced parallel preheated sheets of thermoplastic comprising a top sheet which is flat except for a rim flange and a bottom sheet formed over a plurality of embossing and fusing posts to define supporting pillars integral with the bottom sheet and fused to the top sheet.

PATENTED SEP 14 1971 3,604,368
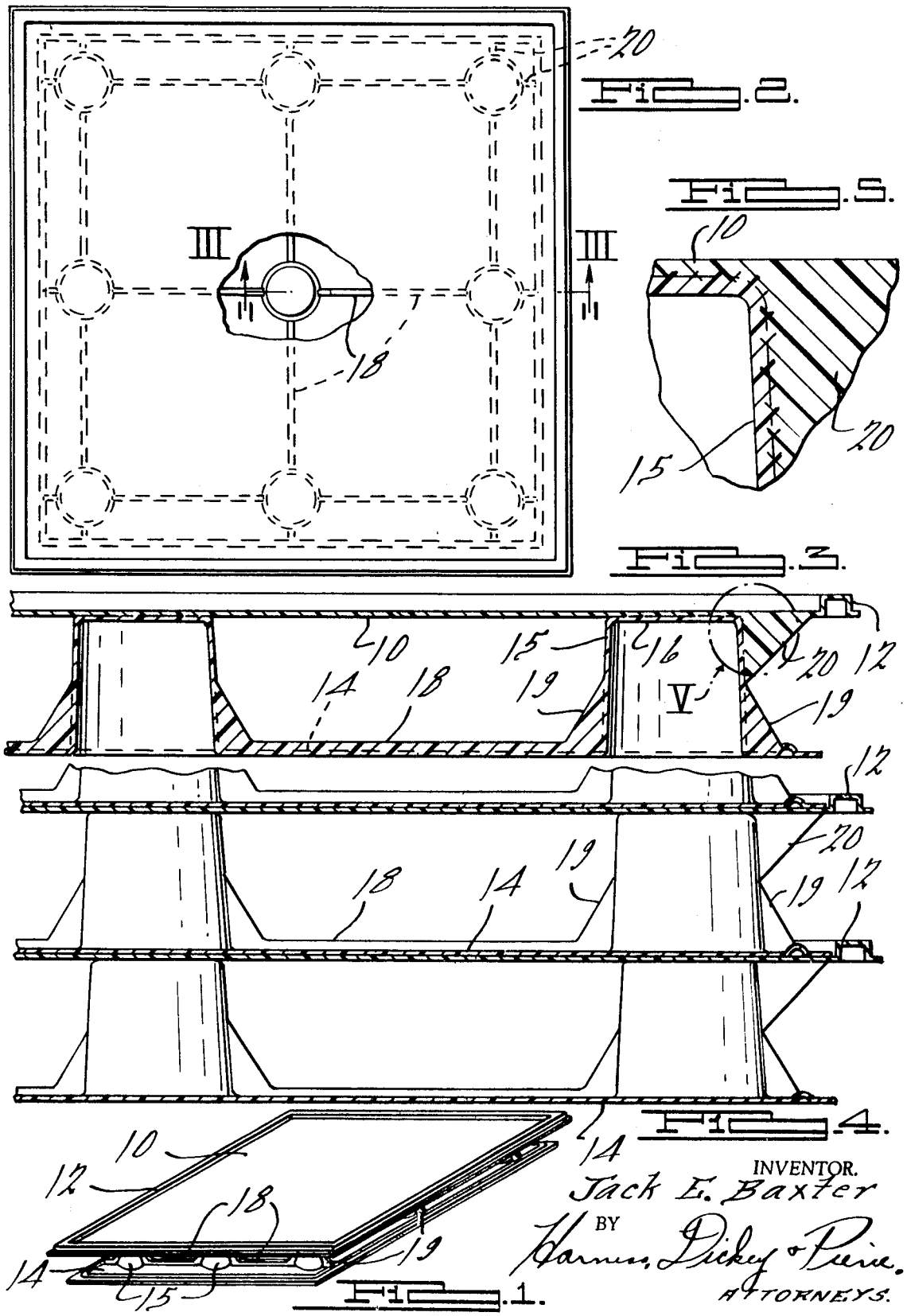
INVENTOR.
Jack E. Baxter
BY
Harness, Dickey & Pierce
ATTORNEYS.

PALLET AND METHOD OF MANUFACTURE

BACKGROUND OF THE INVENTION

The present invention is directed to the provision of an improved pallet construction formed of sheet plastic, and to an efficient and economical method of manufacture thereof which attains great strength in proportion to the weight and cost and which is not subject to deterioration, virtually impervious to moisture and suitable for repeated reuse.

Other objects and advantages will become apparent upon consideration of the present disclosure in its entirety.

BRIEF DESCRIPTION OF THE FIGURES OF DRAWING

FIG. 1 is a perspective view of a pallet constructed in accordance with the present invention;

FIG. 2 is a plan view thereof partly broken away;

FIG. 3 is vertical sectional elevational view of a portion of the pallet, on a larger scale, taken as indicated by the line and arrows III—III of FIG. 2 and looking in the direction of the arrows;

FIG. 4 is a fragmentary sectional elevational view of three pallets in stacked relation; and FIG. 5 is an enlarged detailed sectional view of the area within the circle designated V in FIG. 3.

DETAILED DESCRIPTION OF PREFERRED FORM OF THE INVENTION

Referring now to the drawing, reference characters 10 and 14 designate generally the top and bottom panels of my preferred pallet construction. The panels are formed of a suitable strong thermoplastic such as linear polyethylene. Top panel 10 is flat and rectangular, but provided with an upstanding integral bead 12 extending around and close to its outer edge so that the entire top surface of the panel is slightly recessed. Bottom panel 14 is also rectangular, similarly proportioned and substantially flat, but enough smaller in its dimensions to fit within the space surrounded by bead 12, so that a plurality of empty pallets may be stacked in an interlocked relation shown in FIG. 4 which prevents them from sliding with relation to each other and facilitates handling of stacked empty pallets.

The bottom panel is provided with a plurality of integral substantially cylindrical upwardly embossed portions 15, the upper ends of which are tightly secured to the bottom of panel 10 as by heat fusion so that these parts are effectively integrated. As shown in FIG. 3, the upper end of each embossment 15 is provided with an integral flap top 16, the portion 16 preferably being fused throughout its entire surface to the bottom surface of top panel 10.

Both the top and bottom panels are formed hot by the vacuum molding process. The bottom mold (not shown) is provided with a plurality of round flat-topped posts of uniform height for forming the bosses 15, and is preferably also provided with thin upstanding fins extending radially between and from the posts for forming thin stiffening webs which define reinforcing ribs 18 and gussetlike bracing extensions 19 thereof, the sheet material being drawn downwardly over the fins by the effect of the vacuum as will be understood. The top mold may also be finned to cause the upper sheet material to form bracing gussets 20 extending radially outwardly from positions such that they fuse to the sides of the bosses 15 on the under surface of the top sheet and extend outwardly to positions close to the bead 12. The sheets are formed hot, at a fusable temperature, and the vacuum is maintained to draw the sheets into conformity with the die structures while the dies are pressed together, the top sheet 10 being thereby forced against and fused to the portions of the bottom sheet 14 which overlie the tops of the posts. At the same time the gussets 20 also become fused to the sides of the bosses 15, as indicated and the parts become rigidly connected and braced.

The necessity for the reinforcing ribs and gussets 18, 19, 20 is dependent upon engineering considerations such as the loading for which the pallet is designed, but the ribs 18 are low enough to present no interference to lift truck forks, while the gussets 20 also extend in such directions as to create no interference.

This Detailed Description of Preferred Form of the Invention, and the accompanying drawings, have been furnished in compliance with the statutory requirement to set forth the best mode contemplated by the inventor of carrying out the invention. The prior portions consisting of the Abstract of the Disclosure and the Background of the Invention are furnished without prejudice in an effort to comply with administrative requirements of the Patent Office.

What is claimed is:

1. A pallet formed of spaced parallel top and bottom thermoplastic sheets, the bottom sheet having a plurality of integral upstanding downwardly opening hollow bosslike pillar portions, the top sheet overlying and being fused to the tops of the pillar portions, the pillar portions being of uniform height and having solid flat tops and the top sheet being flat, flat depending bracing ribs integral with the top sheet extending downwardly longitudinally and axially beside, and fused to the sides of, the pillar portions of the bottom sheet and projecting radially from such pillar portions.

2. A pallet as defined in claim 1 wherein said pillar portions are spaced inwardly from the margins of the sheets, at least some of said bracing ribs extending angularly from intermediate areas of said pillar portions to the margins of a sheet and being integrated with both.

3. A pallet as defined in claim 2 including similar bracing ribs integral with the bottom sheet.